(12) United States Patent
Showering

(10) Patent No.: US 9,405,011 B2
(45) Date of Patent: Aug. 2, 2016

(54) NAVIGATION SYSTEM CONFIGURED TO INTEGRATE MOTION SENSING DEVICE INPUTS

(71) Applicant: Hand Held Products, Inc., Fort Mill, SC (US)

(72) Inventor: Paul Edward Showering, Chippenham (GB)

(73) Assignee: Hand Held Products, Inc., Fort Mill, SC (US)

(*) Notice: Subject to any disclaimer, the term of this patent is extended or adjusted under 35 U.S.C. 154(b) by 0 days.

(21) Appl. No.: 14/676,898

(22) Filed: Apr. 2, 2015

(65) Prior Publication Data

US 2015/0204671 A1    Jul. 23, 2015

Related U.S. Application Data

(63) Continuation-in-part of application No. 13/749,827, filed on Jan. 25, 2013, now Pat. No. 9,002,641.

(60) Provisional application No. 61/710,214, filed on Oct. 5, 2012.

(51) Int. Cl.
| | |
|---|---|
| *G01S 1/00* | (2006.01) |
| *G01S 19/48* | (2010.01) |
| *G01S 19/13* | (2010.01) |
| *G01C 21/16* | (2006.01) |
| *G01S 19/50* | (2010.01) |

(Continued)

(52) U.S. Cl.
CPC ............ *G01S 19/13* (2013.01); *G01C 21/165* (2013.01); *G01S 5/02* (2013.01); *G01S 19/49* (2013.01); *G01S 19/50* (2013.01)

(58) Field of Classification Search
USPC ...................... 701/469; 342/357.31
See application file for complete search history.

(56) References Cited

U.S. PATENT DOCUMENTS

| | | | |
|---|---|---|---|
| 4,903,212 | A | 2/1990 | Yokouchi et al. |
| 5,225,842 | A | 7/1993 | Brown et al. |

(Continued)

FOREIGN PATENT DOCUMENTS

| | | |
|---|---|---|
| CN | 102023305 A | 8/2010 |
| EP | 1399757 A2 | 3/2004 |

(Continued)

OTHER PUBLICATIONS

Search Report for GB Application No. 1317237.4 [Published as GB2508486 (Jun. 4, 2014)] (Counterpart to Current Application); Dated Mar. 26, 2014; 8 pages.

*Primary Examiner* — Thomas G Black
*Assistant Examiner* — Tyler Paige
(74) *Attorney, Agent, or Firm* — Additon, Higgins & Pendleton, P.A.

(57) ABSTRACT

A navigation system can comprise a microprocessor, a memory, a navigational signal receiver configured to receive a radio signal from at least one external system, a motion sensing device, and a navigation program executable by the microprocessor. The navigational signal receiver can be communicatively coupled to the microprocessor via a communication port. The navigation program can be configured to receive messages from the navigational signal receiver by communicating to the driver of the communication port. The communication port driver can adjust the current position based on the data returned by the motion sensing device.

20 Claims, 5 Drawing Sheets

(51) Int. Cl.
*G01S 5/02* (2010.01)
*G01S 19/49* (2010.01)

(56) References Cited

U.S. PATENT DOCUMENTS

| | | | |
|---|---|---|---|
| 5,781,150 | A | 7/1998 | Norris |
| 5,862,511 | A | 1/1999 | Croyle et al. |
| 6,029,111 | A | 2/2000 | Croyle |
| 6,114,990 | A * | 9/2000 | Bergljung .............. F41G 3/26 342/357.31 |
| 6,308,134 | B1 | 10/2001 | Croyle et al. |
| 6,721,657 | B2 | 4/2004 | Ford et al. |
| 6,735,523 | B1 | 5/2004 | Lin |
| 6,845,304 | B1 | 1/2005 | Young |
| 6,883,747 | B2 | 4/2005 | Ratkovic et al. |
| 6,992,584 | B2 | 1/2006 | Dooley et al. |
| 7,468,692 | B1 | 12/2008 | Wiegers |
| 7,630,707 | B2 | 12/2009 | Lee et al. |
| 7,848,765 | B2 | 12/2010 | Phillips et al. |
| 8,326,315 | B2 | 12/2012 | Phillips et al. |
| 8,395,496 | B2 | 3/2013 | Joshi et al. |
| 8,638,296 | B1 * | 1/2014 | McIntosh .............. G06F 3/017 345/158 |
| 9,002,641 | B2 | 4/2015 | Showering |
| 2002/0022924 | A1 | 2/2002 | Begin |
| 2003/0008671 | A1 | 1/2003 | Lundgren et al. |
| 2003/0109988 | A1 | 6/2003 | Geissler et al. |
| 2003/0179133 | A1 | 9/2003 | Pepin et al. |
| 2004/0236475 | A1 | 11/2004 | Chowdhary |
| 2005/0134440 | A1 * | 6/2005 | Breed .............. B60N 2/2863 340/435 |
| 2007/0032950 | A1 | 2/2007 | O'Flanagan et al. |
| 2007/0156337 | A1 | 7/2007 | Yanni |
| 2007/0260398 | A1 | 11/2007 | Stelpstra |
| 2008/0318626 | A1 | 12/2008 | Rofougaran |
| 2009/0234582 | A1 | 9/2009 | Figueroa |
| 2010/0097208 | A1 * | 4/2010 | Rosing .............. G06Q 10/087 340/539.13 |
| 2010/0127926 | A1 | 5/2010 | Wang |
| 2010/0164787 | A1 | 7/2010 | Khosravy et al. |
| 2010/0211315 | A1 | 8/2010 | Toda |
| 2011/0191024 | A1 | 8/2011 | DeLuca |
| 2011/0208424 | A1 | 8/2011 | Hirsch et al. |
| 2011/0238307 | A1 | 9/2011 | Psiaki et al. |
| 2012/0129553 | A1 | 5/2012 | Phillips et al. |
| 2012/0129606 | A1 | 5/2012 | Rofougaran et al. |
| 2012/0202485 | A1 | 8/2012 | Mirbaha et al. |
| 2012/0221188 | A1 | 8/2012 | Kelly, III |
| 2014/0129136 | A1 * | 5/2014 | Celia .............. G01C 21/00 701/445 |

FOREIGN PATENT DOCUMENTS

| | | |
|---|---|---|
| EP | 1488197 A1 | 12/2004 |
| GB | 2508486 A | 6/2014 |
| JP | H05010774 A | 1/1993 |
| JP | H07286853 A | 10/1995 |
| WO | 02099453 A2 | 12/2002 |
| WO | 03078929 A1 | 9/2003 |

\* cited by examiner

NAVIGATION SYSTEM CONFIGURED TO INTEGRATE MOTION SENSING DEVICE INPUTS

CROSS-REFERENCE TO RELATED APPLICATIONS

The present application claims the benefit of U.S. patent application Ser. No. 13/749,827 for a Navigation System Configured to Integrate Motion Sensing Device Inputs filed Jan. 25, 2013 (and published Apr. 10, 2014 as U.S. Patent Application Publication No. 2014/0100774), now U.S. Pat. No. 9,002,641, which claims the benefit of U.S. Patent Application No. 61/710,214 for a Navigation System Configured to Integrate Motion Sensing Device Inputs filed Oct. 5, 2012. Each of the foregoing patent applications, patent publication, and patent is hereby incorporated by reference in its entirety.

FIELD OF THE INVENTION

This invention relates generally to navigation systems, and, more specifically, to navigation systems based on mobile computing devices equipped with navigational signal receivers.

BACKGROUND

Mobile computing devices equipped with navigation signals receivers, such as satellite-based navigational system receivers (e.g., GPS receivers) are widely used for vehicle navigation.

SUMMARY

In one embodiment, there is provided a navigation system comprising a microprocessor, a memory, a navigational signal receiver configured to receive a radio signal from at least one external system, a motion sensing device, and a navigation program executable by the microprocessor. The navigational signal receiver can be communicatively coupled to the microprocessor via a communication port. The navigation program can be configured to receive messages from the navigational signal receiver by communicating to the driver of the communication port. The communication port driver can be configured to operate in a first operating mode and a second operating mode. The communication port driver operating in the first operating mode can be configured, responsive to receiving from the navigational signal receiver a message comprising valid geographic coordinates, to store a current spatial position in the memory and forward the message to the navigation program. The communication port driver operating in either the first operating mode or the second operating mode can be configured to adjust, based on motion data received from the motion sensing device, the current spatial position stored in the memory. The communication port driver operating in the first operating mode can be configured, responsive to receiving from the navigational signal receiver a message indicating a failed attempt to obtain valid geographic coordinates, to switch to the second operating mode. The communication port driver operating in the second operating mode can be configured to transmit to the navigation program a message comprising geographic coordinates calculated based on the current spatial position stored in the memory. The messages transmitted by the communication port driver to the navigation program can comply to a pre-defined navigation message standard.

In some embodiments, the external system can be provided by a satellite-based navigation system. In a further aspect, the satellite-based navigation system can be selected from the group consisting of: Global Positioning System (GPS), Global Navigation Satellite System (GLONASS).

In some embodiments, the system can be provided by a mobile computing device. Alternatively, the system can be provided by a mobile computing device communicatively coupled to an external motion sensing device. In a further aspect, the mobile computing device can be provided by smart phone or a portable computer.

In some embodiments, the external motion sensing device can be communicatively coupled to the mobile computing device via a wired communication interface or a wireless communication interface.

In some embodiments, the motion sensing device can be provided by at least three accelerometers configured to measure proper acceleration values along at least three mutually-perpendicular axes. Alternatively, the motion sensing device can be provided by a 9-DOF (degree of freedom) motion sensing unit containing a 3-axis accelerometer, a 3-axis magnetometer, and 3-axis gyroscope sensors. In some embodiments, the motion sensing device can be provided by a speedometer.

In some embodiments, the communication port can be provided by a serial communication port or a parallel communication port.

In some embodiments, the navigation message standard can be provided by NMEA 0183 standard.

In some embodiments, the communication port driver can be configured to transmit the first message and the third message responsive to receiving a request from the navigation program.

In some embodiments, the communication port driver can be configured to calibrate the motion sensing device based on the valid geographic coordinates received from the navigational signal receiver.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
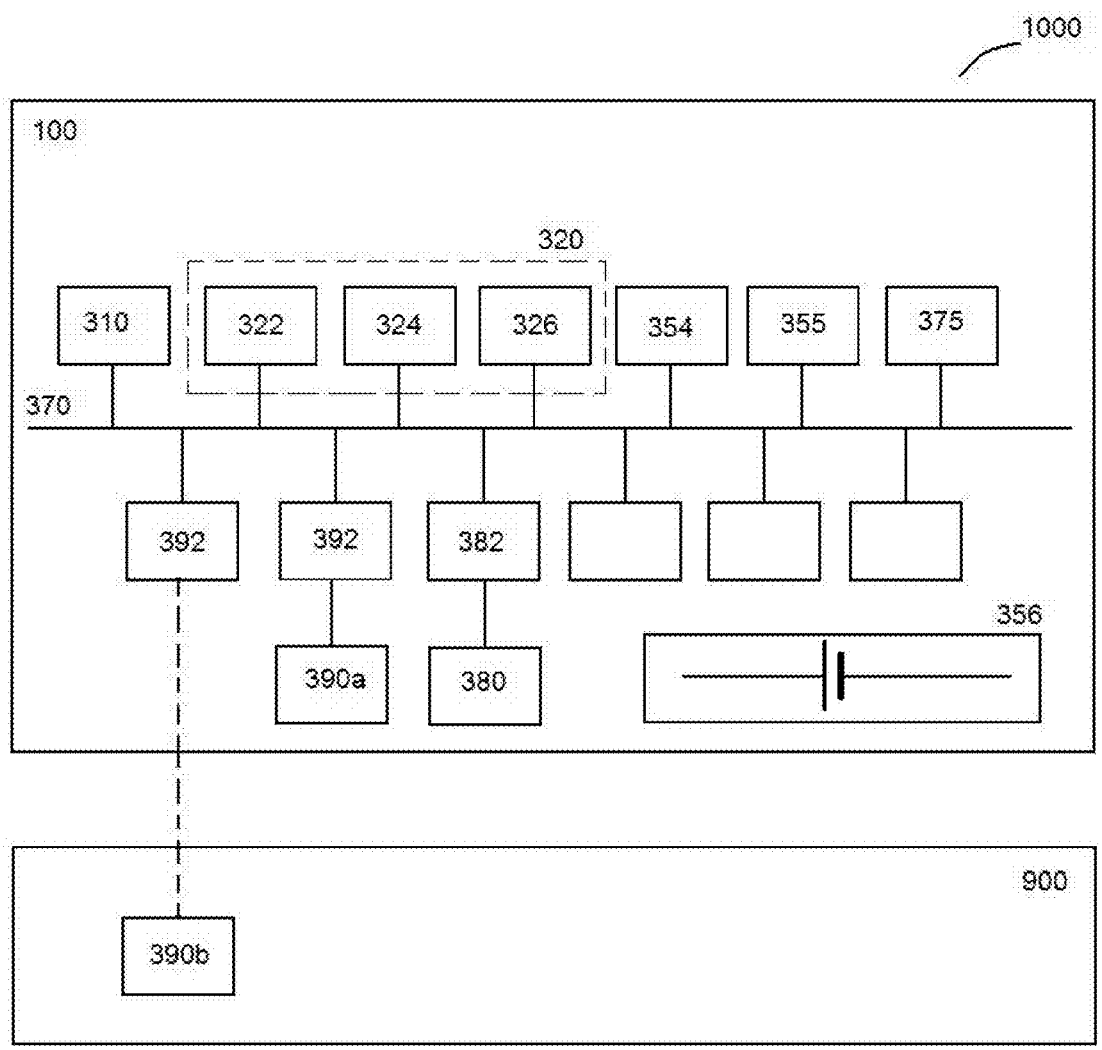
FIG. 1 depicts a component diagram of one illustrative embodiment of a navigation system described herein.

Although devices equipped with navigational signal receivers can under normal circumstances adequately perform vehicle navigation tasks, additional sources of navigational information can be required if the navigational signal is lost, for example, in tunnels, underpasses, in the vicinity of high-rise buildings, etc.

A specialized navigation device or a mobile computing device equipped with a navigational signal receiver can incorporate at least one motion sensing device, such as a speedometer and/or an accelerometer, which can be used for calculating the spatial position and orientation of the device relative to a known point of origin. Conversely, navigation software programs executable by an on-board navigation system or by a mobile computing device can be designed to only read navigational signal receiver inputs.

Navigational signal herein shall refer to a navigational signal received from an external system, including, but not limited to a satellite-based navigation system (such as GPS or GLONASS) or Navigation via Signals of Opportunity (NAVSOP) system.

A "mobile computing device" herein shall refer to a portable programmable device for data processing, including a central processing unit (CPU), a memory, and at least one communication interface. A mobile computing device can be provided, e.g., by a personal digital assistant (PDA), a portable data terminal (PDT), or a smart phone.

A mobile computing device can run a navigation program agnostic of any motion sensing devices (such as speedometers and/or accelerometers) which can be incorporated in the mobile computing device or installed on-board of the vehicle and accessible by the mobile computing device via a wired or wireless interface.

To enable such a navigation program to take advantage of available motion sensing devices without modifying the program code, a specialized communication port driver can be installed on the mobile computing device to support communications of the navigation software program with the communication port to which the navigational signal receiver is connected. A "driver" herein shall refer to a computer program allowing other computer programs to interact with a physical device such as a communication port.

The specialized communication port driver can combine the outputs of a navigational signal receiver and at least one motion sensing device (such as a speedometer or an accelerometer). Upon receiving from the navigational signal receiver a message containing valid geographic coordinates (e.g., a NMEA 0183-compliant message), the communication port driver can transmit the unmodified message to the navigation program. If, however, a message indicating a failed attempt to obtain valid geographic coordinates (e.g., due to loss of the position fix) has been received by the communication port driver, a simulated message (e.g., a NMEA 0183-compliant message) containing geographic coordinates calculated based on the information received from the available motion sensing devices can be transmitted by the driver to the navigation program. A more detailed description of the operation of the communication port driver can be found herein infra.

FIG. 1 depicts a component diagram of one illustrative embodiment of a navigation system described herein. The system 1000 can comprise a mobile computing device 100 including a microprocessor 310 and a memory 320, both coupled to a system bus 370. In some embodiments, the mobile computing device 100 can further comprise a single microprocessor which can be referred to as a central processing unit (CPU). Alternatively, the mobile computing device 100 can comprise two or more microprocessors, for example a CPU and a specialized microprocessor (e.g., an ASIC). In some embodiments, memory 320 can include RAM 322, a nonvolatile memory such as EPROM 324, and a storage memory device 326 such as may be provided by a flash memory or a hard drive memory.

The mobile computing device 100 can further comprise a keyboard interface 354 and a display adapter 355, both also coupled to system bus 370. The mobile computing device 100 can further comprise a battery 356. In some embodiments, the mobile computing device 100 can further comprise at least one connector 375 configured to receive a subscriber identity module (SIM) card.

The mobile computing device 100 can further comprise a navigational signal receiver 380 which can be communicatively coupled to the system bus 370 via a communication port 382. In some embodiments, navigational signal receiver 380 can be provided by a radio signal receiver configured to receive radio signals originated by satellite-based radio transmitters (such as GPS or GLONASS). Alternatively, navigational signal receiver 380 can be provided by a radio signal receiver configured to receive NAVSOP signals. A skilled artisan would appreciate the fact that other types of navigational signal receivers are within the scope of this disclosure.

In a further aspect, navigational signal receiver 380 can be configured to calculate geographic coordinates based on the navigational signals received (e.g., based on GPS, GLONASS, or NAVSOP signals).

In a further aspect, the navigational signal receiver 380 can be configured to transmit messages compliant with a pre-defined navigation message standard, such as NMEA 0183 standard.

In some embodiments, the mobile computing device 100 can further comprise one or more motion sensing devices 390a-390b which can be communicatively coupled to the system bus via one or more communication ports 392.

In a further aspect, each of the communication ports 382 and/or 392 can be provided by a serial communication port (e.g., an RS/232-compliant communication port, an RS/485-compliant communication port, or a USB communication port). Alternatively, each of the communication ports 382 and/or 392 can be provided by a parallel communication port. A skilled artisan would appreciate the fact that other implementations of communication ports 382 and/or 392 are within the scope of this disclosure.

In some embodiments, at least one of the motion sensing devices 390a-390b can be provided by at least three accelerometers configured to measure proper acceleration values along at least three mutually-perpendicular axes. In some embodiments, the motion sensing device can be provided by a 9-DOF (degree of freedom) motion sensing unit containing a 3-axis accelerometer, a 3-axis magnetometer, and 3-axis gyroscope sensors.

In a further aspect, motion sensing device 390a can be incorporated into the mobile computing device. Alternatively, motion sensing device 390b can be provided by an external device, such as an onboard speedometer installed on a motor vehicle 900, in communication with the mobile computing device via a wired or wireless communication interface.

Figure 2:
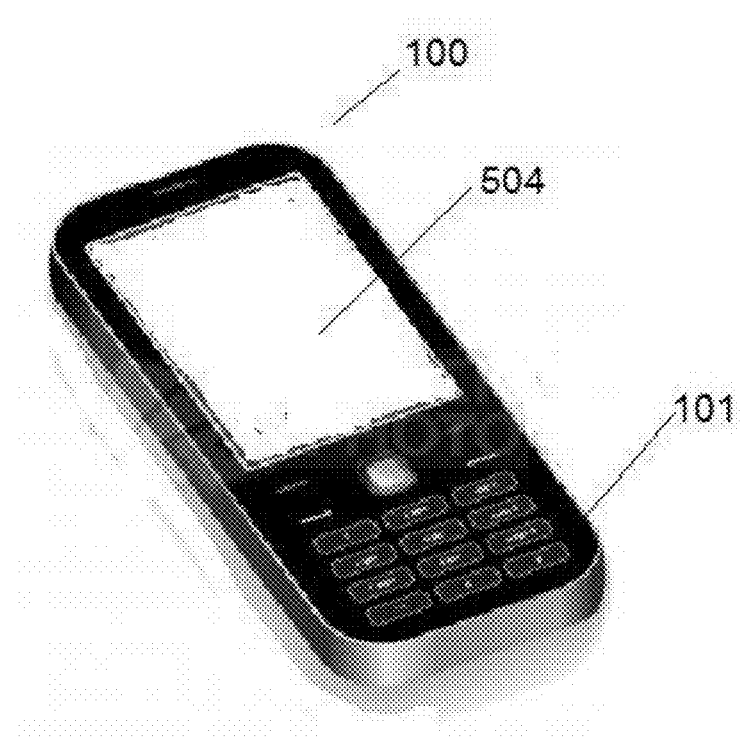
FIG. 2 schematically illustrates a mobile computing device.

The components of mobile computing device 100 can be incorporated into a variety of different housings of various forms factors. In one embodiment, schematically shown in FIG. 2, mobile computing device 100 can be provided by a smartphone. Smartphone 100 can comprise a hand held housing 101 and a display 504 having an associated touch screen overlay. A skilled artisan would appreciate the fact that other housings and form factors of mobile computing device 100 are within the scope of this disclosure.

As noted herein supra, a specialized communication port driver can be installed on the mobile computing device to support communications of the navigation software program with the communication port to which the navigational signal receiver is connected. The communication port driver can combine the outputs of the navigational signal receiver and at least one motion sensing device (such as a speedometer or an accelerometer).

In one illustrative embodiment, the communication port driver can operate in interrupt-driven mode of operation. The communication port driver can intercept the hardware interrupts generated by the communication port to which the navigational signal receiver is attached. In a further aspect, a hardware interrupt can be generated by the communication port when one or more bytes transmitted by the navigational signal receiver are available in the input buffer of the communication port. Another type of a software interrupt can be generated by the communication port when the output buffer of the communication port is ready to receive one or more bytes to be transmitted.

Alternatively, in the polling mode of operation, the communication port driver can periodically poll one or more status signals (e.g., DSR/DTR signals) indicating the presence of one or more bytes in the input buffer of the communication port. For transmitting one or more bytes, the communication port driver can assert the Request-to-Send (RTS) signal and then periodically poll the status of the Clear-to-Send (CTS) signal indicating that one or more bytes can be placed into the output buffer of the communication port.

In either interrupt-driven or polling mode of operation, the communication port driver can maintain an input queue holding one or more bytes received from the navigational signal receiver and an output queue holding one or more bytes to be sent to the navigational signal receiver.

As noted herein supra, in addition to communicating with the navigational signal receiver, the communication port driver can communicate with at least one motion sensing device (for example, a speedometer or an accelerometer). In some embodiments, at least one motion sensing device can be incorporated into the mobile communication device, and can be communicatively coupled to the system bus 370 via an interface circuit. Alternatively, the mobile communication device can communicate with at least one external motion sensing device (e.g., a motor vehicle speedometer, or an onboard accelerometer) via a second communication port.

Figure 3A:
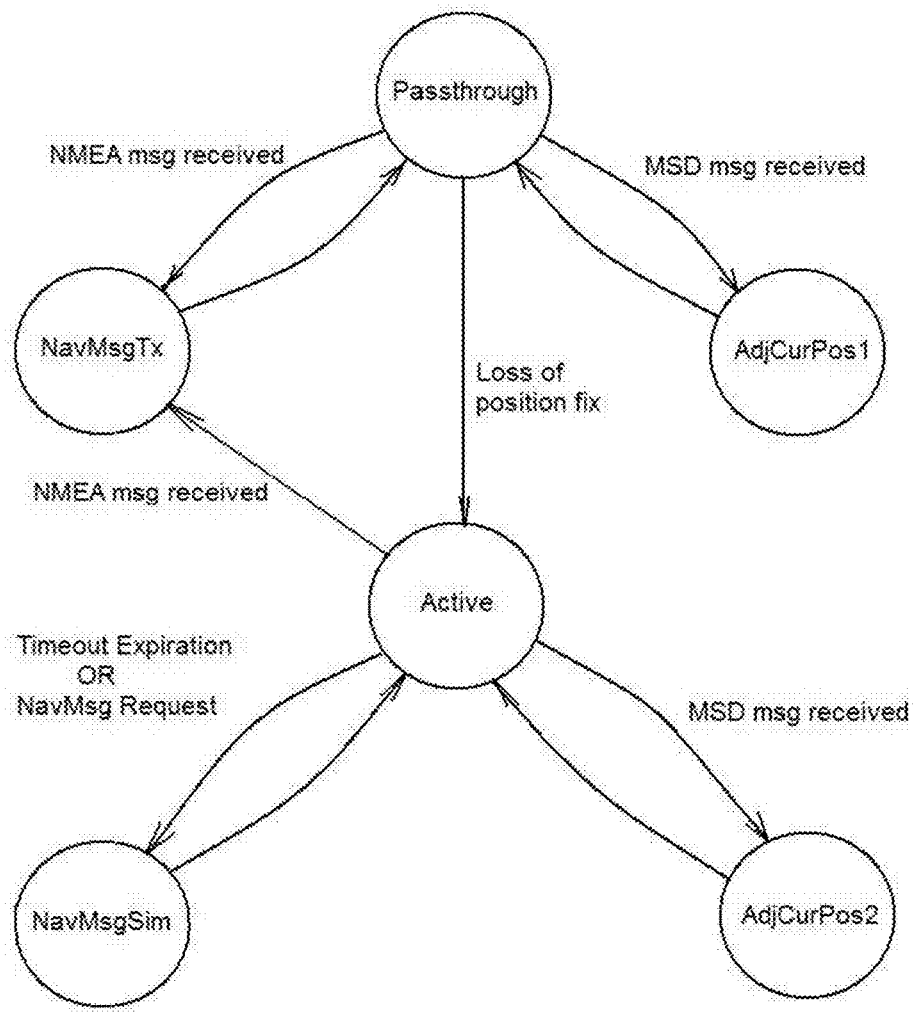
FIGS. 3a-3b schematically illustrate various embodiments of the state machines implemented by the communication port driver described herein.

In a further aspect, the driver of the communication port to which the navigational signal receiver is connected can be configured to implement a state machine schematically shown in FIG. 3*a*.

Upon initialization, the communication port driver can transition to the Pass-through state and wait until a message is received from the navigational signal receiver or from at least one motion sensing device (for example, a speedometer, or an accelerometer). As noted herein supra, in some embodiments, the messages sent by the navigational signal receiver can comply with NMEA 0183 standard. A skilled artisan would appreciate the fact that other navigational message standards and formats are within the scope of this disclosure.

Responsive to receiving, while being in the Pass-Through state, a message containing valid geographic coordinates from the navigational signal receiver, the communication port driver can transition to the NavMsgTx state. Upon storing in the memory the current spatial position represented by the geographic coordinates and forwarding the message containing the geographic coordinates to the navigation program, the communication port driver can return to the Pass-Through state.

Responsive to receiving, while being in the Pass-Through state, a message containing motion sensing data from a motion sensing device, the communication port driver can transition to the AdjCurPos1 state. Upon adjusting, based on the motion sensing data, the current spatial position stored in the memory, the communication port driver can return to the Pass-Through state.

Responsive to receiving, while being in the Pass-Through state, a message indicating loss of valid position fix from the navigational signal receiver, the communication port driver can transition to the Active state.

Responsive to receiving, while being in the Active state, a message containing motion sensing data from a motion sensing device, the communication port driver can transition to the AdjCurPos2 state. Upon adjusting, based on the motion sensing data, the current spatial position stored in the memory, the communication port driver can return to the Active state.

Responsive to receiving, while being in the Active state, a message from the system timer indicating a timeout expiration or a message from the navigation program requesting the current geographic coordinates, the communication port driver can transition into the NavMsgSim1 state. Upon constructing a simulated navigational information message (e.g., a NMEA message) containing the geographic coordinates of the stored current spatial position, the communication port driver can return to the Active state.

Responsive to receiving, while being in the Active state, a message containing valid geographic coordinates from the navigational signal receiver, the communication port driver can transition to the NavMsgTx state. Upon storing in the memory the current spatial position represented by the geographic coordinates and forwarding the message containing the geographic coordinates to the navigation program, the communication port driver can transition to the Pass-Through state.

Figure 3B:
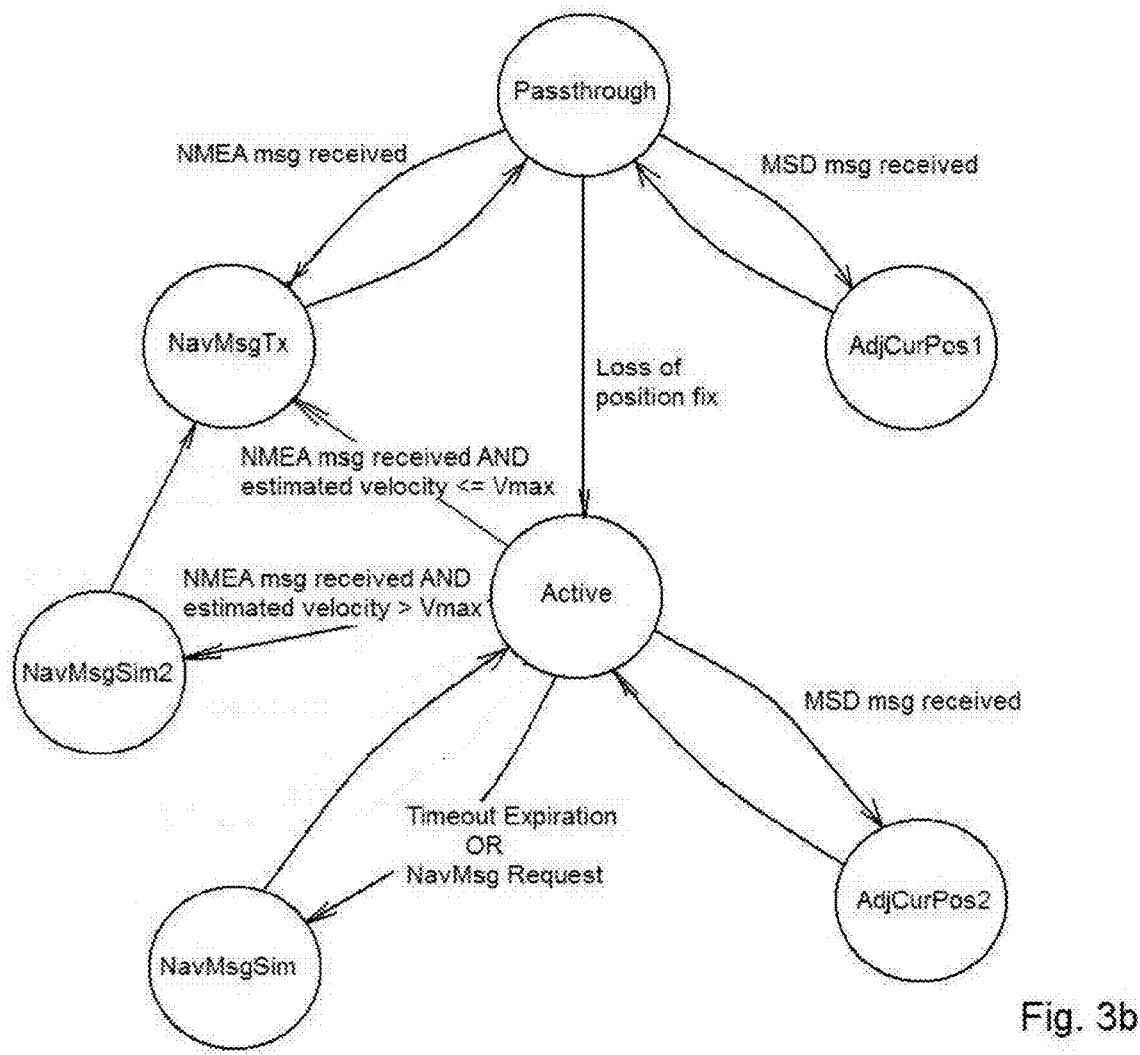

In another illustrative embodiment, schematically shown in FIG. 3*b*, the communication port driver operating in the Active state can, responsive to receiving a message containing valid geographic coordinates from the navigational signal receiver, analyze the difference between the approximated spatial position calculated based on the motion sensing data and the current spatial position reported by the navigational signal receiver, to ascertain that the apparent velocity calculated based on two subsequent messages transmitted by the communication port driver to the navigation program would not exceed a pre-defined threshold velocity, due to possible errors introduced by calculating the current position based on the motion sensing data in the absence of valid coordinate readings from the navigational signal receiver. The apparent velocity can be calculated as the distance between the current spatial position reported by the navigational signal receiver and the last approximated spatial position calculated based on the motion sensing data, divided by the time elapsed since the message containing the last spatial position calculated based on the motion sensing data has been transmitted by the communication port driver to the navigation program. Hence, responsive to receiving, while being in the Active state, a message containing valid geographic coordinates from the navigational signal receiver, the communication port driver can transition to the NavMsgTx state if the apparent velocity is less than a pre-defined threshold value; otherwise, the communication port driver can transition to the NavMsgSim2 state.

The communication port driver operating in the NavMsgSim2 state can transmit to the navigation program a simulated navigational information message (e.g., a NMEA message) containing the geographic coordinates of a point found on the trajectory between the last spatial position reported by the communication port driver to the navigation program and the current spatial position reported by the navigational signal receiver. The distance between the previously reported and the current position can be calculated based on the pre-defined maximum velocity value. The communication port driver can remain in the NavMsgSim2 state and transmit two or more simulated messages, until the simulated position reaches the actual current position, at which point the communication port driver can transition to NavMsgTx state.

As described herein, the system includes two states in which it generates simulated satellite navigation messages—these are referred to as NavMsgSim and NavMsgSim2. In the NavMsgSim state, the satellite signal has been lost, and so inertial navigation is being used to generate the messages. However, when the satellite signal is regained, the position fix will in all probability not coincide exactly with the last inertial navigation fix due to the inherent limitations of all such inertial systems. Although the system may want to switch back to the true satellite position fix immediately, such an immediate switch may cause problems for software (or people) analyzing the track of the vehicle afterwards.

Figure 4:
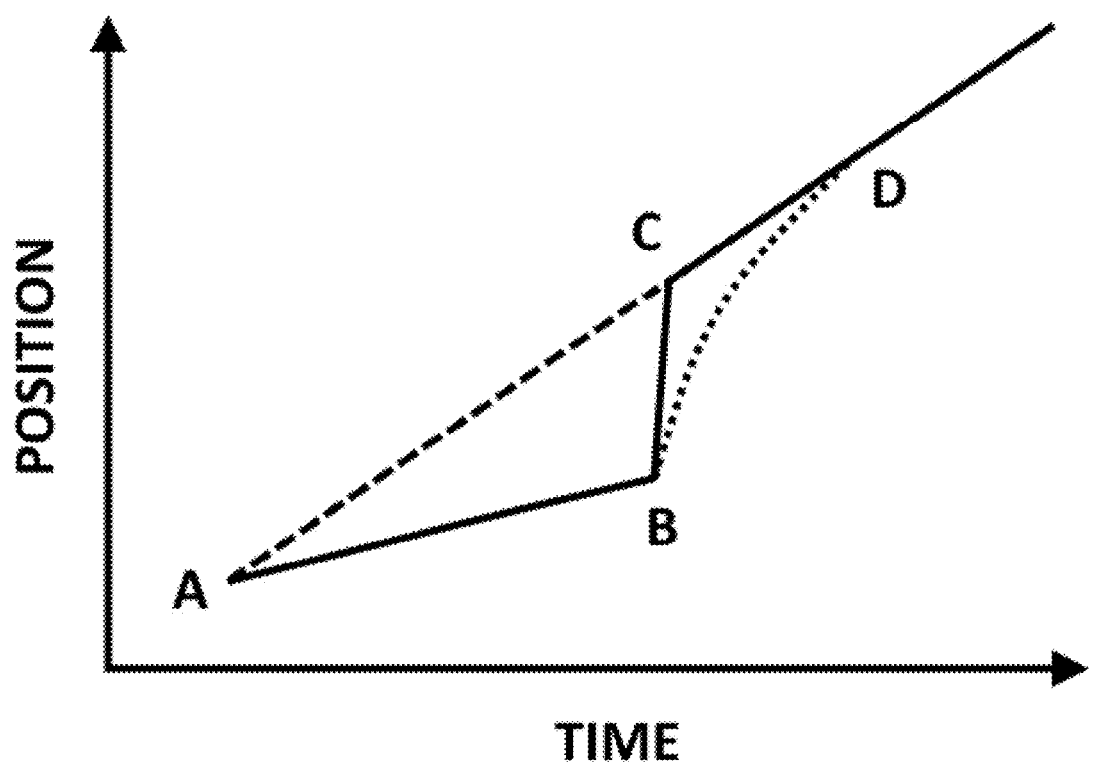
FIG. 4 schematically depicts an exemplary graph of a vehicle's true and tracked position as a function of time.

Suppose, for example, that the inertial navigation fix is showing the vehicle travelling down a road, but at less than the actual true vehicle speed. As time goes on, the calculated position of the vehicle will lag behind the true position, so that when the true position becomes available again, there may be a considerable distance between the two. If this information were allowed to be passed untouched through to the navigation software, the system would recognize this distance when analyzing the vehicle's track. FIG. 4 schematically depicts an exemplary graph of a vehicle's true and tracked position as a function of time.

In FIG. 4, the unbroken line A-B represents the track of the vehicle calculated in state NavMsgSim after the satellite signal is lost at point A, and the dashed line A-C represents the true track of the vehicle that would have been reported had the signal not been lost. At point C, the satellite signal is regained, and so in this example, the location expressed by point C is reported shortly after that expressed by point B. When the track is analyzed, it appears as though the vehicle has made a very sudden acceleration to a high speed in order to get from B to C, which could be interpreted as wasteful, erratic, unsafe, or even illegal behavior on the part of the person operating the vehicle.

The solution is to put the system into a state whereby it will transition more gradually from the last inertial fix at B to the true track of the vehicle C-D, and this will appear as the dotted line B-D. The NavMsgSim2 state achieves this transition, and at each stage it calculates how far the vehicle could have traveled from its last reported position in the direction of the true vehicle position at a maximum speed referred to as the threshold velocity. Any software (or person) analyzing the vehicle track at a later stage will not see the vehicle exceed that threshold velocity when transitioning from a potentially inaccurate inertial fix to an accurate satellite fix. The threshold velocity could be set, for example, to 30 miles-per-hour, which would in most cases not show the vehicle to be exceeding a speed limit. In some embodiments, the system derives the threshold velocity dynamically from the calculated location of the vehicle by referencing a database of speed limits. For example, the threshold velocity could be set to 30 miles-per-hour in a city, but 60 miles-per-hour in open country.

A sample of systems and methods that are described herein follows:

A1. A navigation system comprising: a microprocessor; a memory; a navigational signal receiver communicatively coupled to said microprocessor via a communication port, said navigational signal receiver configured to receive a radio signal from at least one external system; a motion sensing device; a communication port driver in communication with said communication port; a navigation program executable by said microprocessor, said navigation program configured to receive messages from said navigational signal receiver by communicating to said communication port driver; wherein said communication port driver is configured to operate in a first operating mode and a second operating mode; wherein said communication port driver operating in said first operating mode is configured, responsive to receiving from said navigational signal receiver a first message comprising valid geographic coordinates, to store a current spatial position in said memory and forward said first message to said navigation program; wherein said communication port driver operating in either said first operating mode or said second operating mode is configured to adjust, based on motion data received from said motion sensing device, said current spatial position stored in said memory; wherein said communication port driver operating in said first operating mode is configured, responsive to receiving from said navigational signal receiver a second message indicating a failed attempt to obtain valid geographic coordinates, to switch to said second operating mode; wherein said communication port driver operating in said second operating mode is configured to transmit a third message to said navigation program, said third message comprising geographic coordinates calculated based on said current spatial position stored in said memory; and wherein said first message, said second message, and said third message comply to a pre-defined navigation message standard. A2. The navigation system of (A1), wherein said external system is provided by a satellite-based navigation system. A3. The navigation system of (A2), wherein said satellite-based navigation system is selected from the group consisting of: Global Positioning System (GPS), Global Navigation Satellite System (GLONASS). A4. The navigation system of (A1), wherein said system is provided by a mobile computing device. A5. The navigation system of (A1), wherein said system is provided by a mobile computing device selected from the group consisting of: a smart phone and a portable computer. A6. The navigation system of (A1), wherein said system is provided by a mobile computing device communicatively coupled to an external motion sensing device. A7. The navigation system of (A6), wherein said external motion sensing device is communicatively coupled to said mobile computing device via at least one of: a wired communication interface and a wireless communication interface. A8. The navigation system of (A1), wherein said motion sensing device is provided by at least three accelerometers configured to measure proper acceleration values along at least three mutually-perpendicular axes. A9. The navigation system of (A1), wherein said motion sensing device is provided by a 9-DOF (degree of freedom) motion sensing unit containing a 3-axis accelerometer, a 3-axis magnetometer, and 3-axis gyroscope sensors. A10. The navigation system of (A1), wherein said motion sensing device is provided by a speedometer. A11. The navigation system of (A1), wherein said communication port is provided by one of: a serial communication port, a parallel communication port. A12. The navigation system of (A1), wherein said pre-defined navigation message standard is provided by NMEA 0183 standard. A13. The navigation system of (A1), wherein said communication port driver is configured to transmit said first message and said third message responsive to receiving a request from said navigation program. A14. The navigation system of (A1), wherein said communication port driver is configured to calibrate said motion sensing device based on said valid geographic coordinates received from said navigational signal receiver.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A navigation system, comprising:
a microprocessor;
a motion sensing device generating motion sensing data;
a navigational signal receiver communicatively coupled to the microprocessor via a communication port, the navigational signal receiver configured to receive a radio signal comprising geographical coordinates from an external system;
a memory storing a threshold velocity and the geographic coordinates received by the navigational signal receiver;
a communication port driver in communication with the communication port; and
a navigation program executable by the microprocessor, the navigation program configured to receive messages from the navigational signal receiver by communicating with the communication port driver;
wherein the communication port driver is configured to simulate geographical coordinates for an approximated spatial position in response to receipt of valid geographical coordinates from the external system after a failure to receive valid geographical coordinates from the external system, and
the communication port driver being configured to simulate geographical coordinates is comprised of the communication port driver being configured to calculate the approximated spatial position:
based on the geographic coordinates stored in the memory, the motion sensing data, and the threshold velocity, and
such that the simulated geographical coordinates do not exhibit a track exceeding the threshold velocity between:
a final simulated position for a time before receipt of the valid geographical coordinates from the external system and
the valid geographical coordinates received from the external system.

2. The navigation system of claim 1, wherein the threshold velocity is 30 miles per hour.

3. The navigation system of claim 1, wherein the threshold velocity is 60 miles per hour.

4. The navigation system of claim 1, wherein the system derives the threshold velocity dynamically from the calculated location of the vehicle by referencing a database of speed limits.

5. The navigation system of claim 1, wherein the navigation system is provided by a mobile computing device.

6. The navigation system of claim 1, wherein the motion sensing device comprises at least three accelerometers configured to measure proper acceleration values along at least three mutually-perpendicular axes.

7. The navigation system of claim 1, wherein the motion sensing device is a speedometer.

8. A navigation system, comprising:
a microprocessor;
a motion sensing device generating motion sensing data;
a navigational signal receiver communicatively coupled to the microprocessor via a communication port, the navigational signal receiver configured to receive a radio signal comprising geographical coordinates from an external system;
a memory storing a threshold velocity and the geographic coordinates received by the navigational signal receiver;
a communication port driver in communication with the communication port; and
a navigation program executable by the microprocessor, the navigation program configured to receive messages from the navigational signal receiver by communicating with the communication port driver;
wherein the communication port driver is configured to simulate geographical coordinates for an approximated spatial position in response to receipt of valid geographical coordinates from the external system after a failure to receive valid geographical coordinates from the external system, and the communication port driver being configured to simulate the geographical coordinates is comprised of the communication port driver being configured to calculate the approximated spatial position:
based on the geographic coordinates stored in the memory, the motion sensing data, and the threshold velocity, and
such that the simulated geographical coordinates do not exhibit a track exceeding the threshold velocity between:
a final simulated position for a time before receipt of the valid geographical coordinates from the external system and
the valid geographical coordinates received from the external system; and
wherein the navigation program is configured to receive messages that comply to a pre-defined navigation message standard.

9. The navigation system of claim 8, wherein the threshold velocity is 30 miles per hour.

10. The navigation system of claim 8, wherein the threshold velocity is 60 miles per hour.

11. The navigation system of claim 8, wherein the system derives the threshold velocity dynamically from the calculated location of the vehicle by referencing a database of speed limits.

12. The navigation system of claim 8, wherein the navigation system is provided by a mobile computing device.

13. The navigation system of claim 8, wherein the motion sensing device is a speedometer.

14. A navigation system, comprising:
a microprocessor;
a motion sensing device generating motion sensing data;
a navigational signal receiver communicatively coupled to the microprocessor via a communication port, the navigational signal receiver configured to receive a radio signal comprising geographical coordinates from an external system, the external system comprising a satellite-based navigation system;
a memory storing a threshold velocity and the geographic coordinates received by the navigational signal receiver;
a communication port driver in communication with the communication port; and
a navigation program executable by the microprocessor, the navigation program configured to receive messages from the navigational signal receiver by communicating with the communication port driver;

wherein the communication port driver is configured to simulate geographical coordinates for an approximated spatial position in response to receipt of valid geographical coordinates from the external system after a failure to receive valid geographical coordinates from the external system, and the communication port driver being configured to simulate the geographical coordinates is comprised of the communication port driver being configured to calculate the approximated spatial position:
- based on the geographic coordinates stored in the memory, the motion sensing data, and the threshold velocity, and
- such that the simulated geographical coordinates do not exhibit a track exceeding the threshold velocity between:
  - a final simulated position for a time before receipt of the valid geographical coordinates from the external system and
  - the valid geographical coordinates received from the external system.

15. The navigation system of claim 14, wherein the satellite-based navigation system is a Global Positioning System (GPS) and/or a Global Navigation Satellite System (GLONASS).

16. The navigation system of claim 14, wherein the threshold velocity is 30 miles per hour.

17. The navigation system of claim 14, wherein the system derives the threshold velocity dynamically from the calculated location of the vehicle by referencing a database of speed limits.

18. The navigation system of claim 14, wherein the navigation system is provided by a mobile computing device.

19. The navigation system of claim 14, wherein the motion sensing device comprises at least three accelerometers configured to measure proper acceleration values along at least three mutually-perpendicular axes.

20. The navigation system of claim 14, wherein the motion sensing device is a speedometer.

\* \* \* \* \*